United States Patent [19]

Bucci

[11] Patent Number: 4,961,451

[45] **Date of Patent: * Oct. 9, 1990**

[54] SHARPENER FOR RECTANGULAR PENCILS

[76] Inventor: Albert W. Bucci, 27253 Eastvale Rd., Rolling Hills Estates, Calif. 90274

[*] Notice: The portion of the term of this patent subsequent to Nov. 9, 2006 has been disclaimed.

[21] Appl. No.: 225,937

[22] Filed: Jul. 29, 1988

Related U.S. Application Data

[63] Continuation-in-part of Ser. No. 48,265, May 11, 1987, abandoned.

[51] Int. Cl.[5] .................................................. B23B 5/00

[52] U.S. Cl. .................................. 144/28.7; 144/28.1; 30/451

[58] Field of Search .................... 144/28.1, 28.3, 28.6, 144/28.7, 28.8; 30/451

[56] References Cited

U.S. PATENT DOCUMENTS

| | | | |
|---|---|---|---|
| 2,189,476 | 2/1940 | Siggelko | 144/28.7 |
| 2,979,031 | 4/1961 | Philbotte | 144/28.7 |
| 4,054,164 | 10/1977 | Kose et al. | 144/28.7 |

*Primary Examiner*—W. Donald Bray

*Attorney, Agent, or Firm*—Lee W. Tower

[57] ABSTRACT

Power operated sharpener for nonconic rectangular pencils has single, orbital, weight-balanced cylindrical milling cutter which follows orbital path set by the track of an eliptical internal gear. The cylindrical milling cutter is carried loosely upstanding within an elliptic conic space rising from the track, so as to accommodate the rectangular shape of the workpiece. In operation the sharpener puts a taper on each of the four sides of the end of a rectangular pencil.

5 Claims, 2 Drawing Sheets

FIG. 1
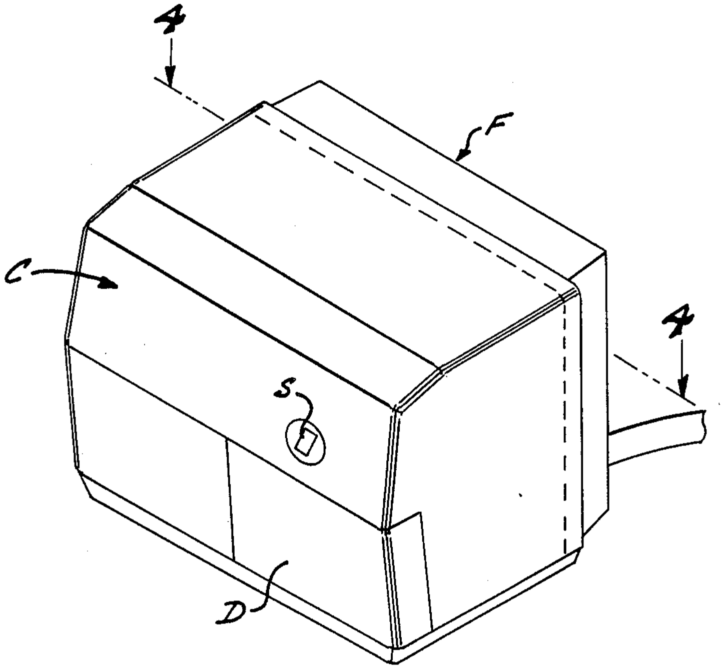
FIG. 3
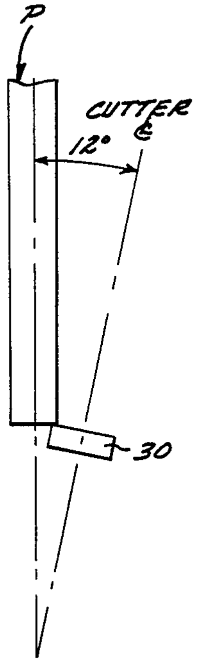
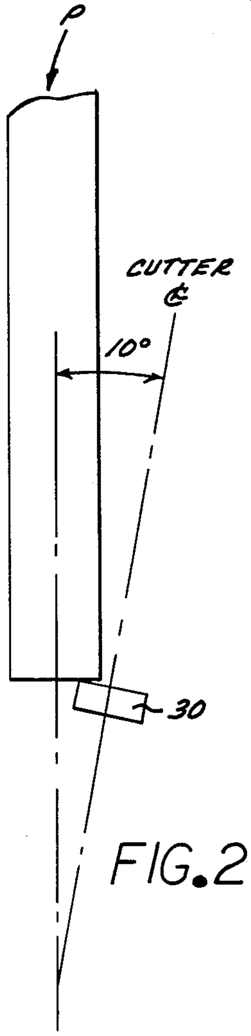
FIG. 2
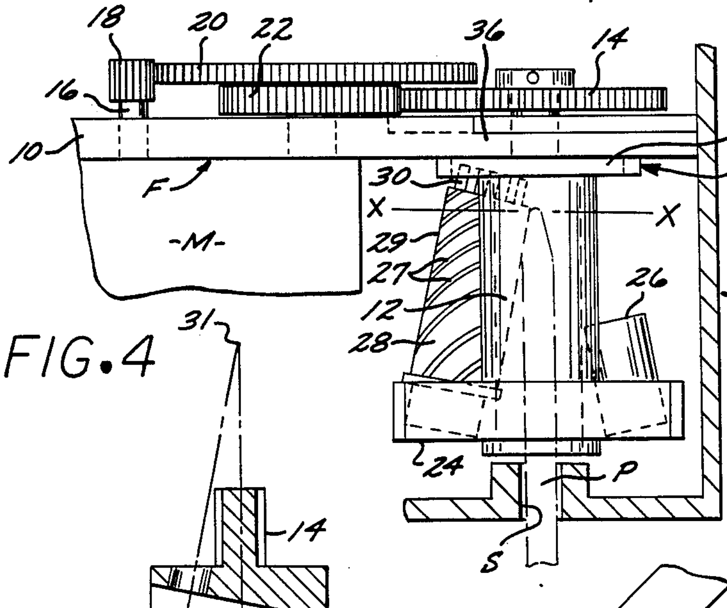
FIG. 4
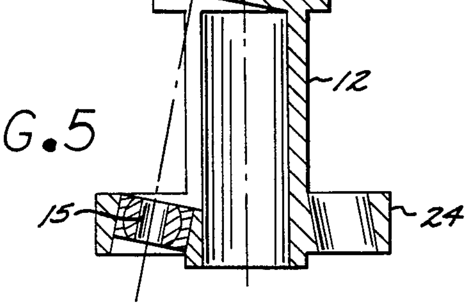
FIG. 5
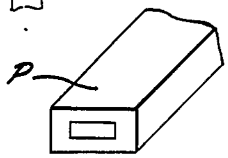
FIG. 6

SHARPENER FOR RECTANGULAR PENCILS

This application is a continuation-in-part of pending U.S. patent application Ser. No. 07/048265, filed May 11, 1987, now abandoned.

BACKGROUND OF THE INVENTION

This invention relates to a mechanical pencil sharpener for non-circular (nonconic) pencils and particularly to a sharpener for those rectangular pencils known as "carpenter's pencils." These are customarily sharpened by the workman or user with a pocket knife, because acceptable mechanical sharpeners have not become available. However, the art shows various attempts have been made to this end, as by sharpening each of the four faces or sides separately. Alternately, an oval base configuration such as exemplified by a cosmetic pencil of the kind used by make-up artists can be produced by multiple pairs of cams, as described in the 1978 U.S. Pat. No. to Galli 4,081,010.

SUMMARY OF THE INVENTION

Accordingly, the invention provides a motor-driven straight edge producing sharpener which employs a "guidance" elliptical internal gear as a steering element in shaping a resulting tapered rectangular-sided facing. That is, by use of a simple construction employing a loose-guiding elliptical internal or ring gear, the rectangular edged product is produced. Thus, the invention can produce a sharpened rectangular point on the end of a polygonal sided pencil. When dull from use, such pencil can be readily resharpened and in this process the existing faces are trimmed to form the desired sharpened rectangular point on the pencil.

The features of the present invention which are believed to be novel are set forth with particularity in the appended claims. Other objects and many of the attendant feature of this invention will be more readily appreciated as the same becomes better understood by reference to the following detailed description and considered in connection with the accompanying drawings in which like reference symbols designate like parts throughout the figures.

DESCRIPTION OF THE DRAWINGS

FIG. 1 is a perspective view of the Pencil Sharpener seen from above.

FIG. 2 is a schematic representation of the slanted center line of a rotating cutter, shown relative to the broad side of an engaged pencil being cut.

FIG. 3 is a schematic representation of the slanted center line of a rotating cutter, shown relative to the narrow side of an engaged pencil being cut.

FIG. 4 is a horizontal section through the housing structure of the cutter assembly and motor-driven operating gears.

FIG. 5 is a vertical section through the cutter support assembly with the cutter and drive pinion removed.

FIG. 6 is a perspective view of an end of a polygonal sided pencil before being sharpened.

DESCRIPTION OF THE PREFERRED EMBODIMENT

Figure 7:
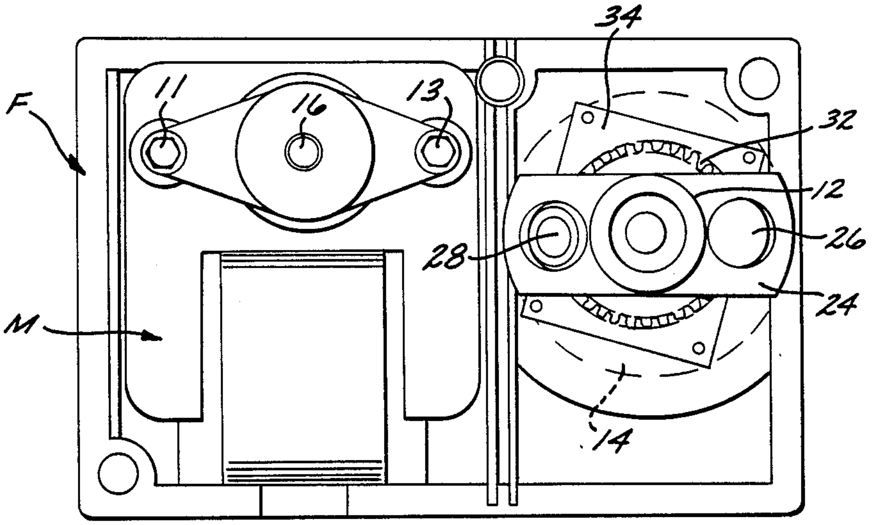
FIG. 7 is a front elevational view of the pencil sharpener with the case removed.
Figure 8:
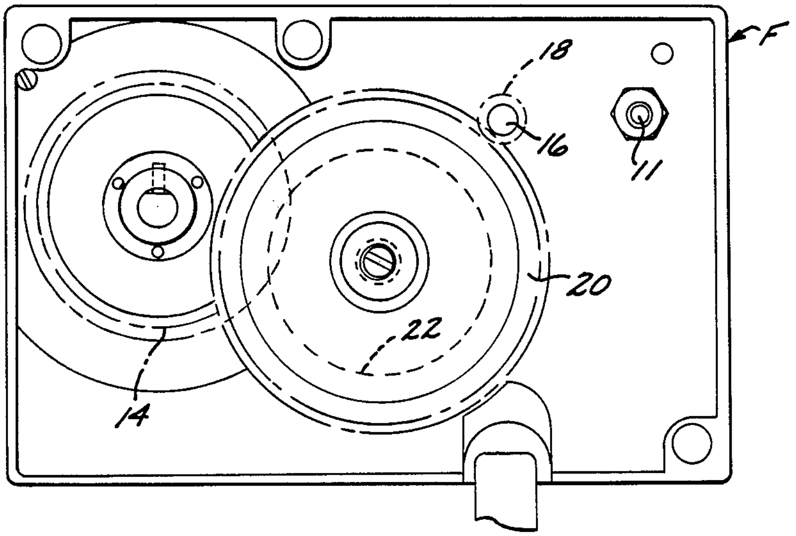
FIG. 8 is a rear elevational view of the pencil sharpener.

A pencil sharpener housing is formed by a generally rectangular, open face, frame F, inserted edgewise within the open back of a rectangular case or front cover C (FIG. 1). The cover is traversed by a rectangular pencil insert slot S, the dimensions of which are just slightly greater than the cross-sectional dimensions of a carpenter's pencil P, as shown in FIG. 6, and a removable cuttings drawer D. Dependent from a horizontal span 10 of the support frame F is a cutter support assembly 12 (FIG. 4) which positions a cylindrical milling cutter 28 with spiral cutting edges 27 and having a pinion gear 30 at one end which meshes with the teeth of an elliptical internal gear 32.

Figure 9:
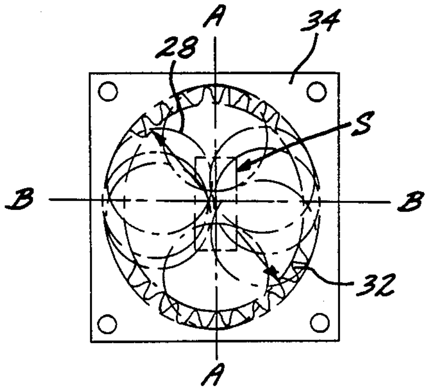
FIG. 9 is a view of a rectangular plate having a generally elliptical aperture with internal gear teeth formed therein, showing in phantom-lines the orientation of the rectangular pencil slot with respect to the ellipse, and also showing a series of phantom-line circles representating the cutting edge of the cutter at section line X—X in FIG. 4 as the pinion gear travels around the elliptical internal gear.

A cutter drive gear 14 drives the cutter support assembly 12 with the orbiting cylindrical milling cutter 28 supported by a self-aligning bearing 15 (FIG. 5). As shown in FIG. 4, the drive gear 14 is driven from an electric motor M via a gear train consisting of motor drive shaft 16, pinion 18, main drive gear 20 and intermediate gear 22. Electric motor M is suspended within the cage by horizontal mounting bolts 11 and 13, as shown in FIG. 7. An annular bracket 24 on cutter support assembly 12 supports two laterally balanced elements consisting of a counterweight 26 and the cylindrical milling cutter 28. The cylindrical milling cutter 28 is rotated by pinion gear 30 being engaged by successive teeth of elliptical internal gear 32 (FIG. 9). The elliptical internal gear 32 is formed in a flat plate 34 that is attached to one side of a wall 36 comprising part of the support frame F. The flat plate 34 is positioned with the center of the ellipse coinciding with the axis of rotation of cutter support assembly 12. As shown in FIG. 9, the ellipse has a major axis A—A and a minor axis B—B, the difference in their lengths being approximately equal to the longer cross-sectional dimension of the pencil lead, as shown in FIG. 6, which is typically about one-quarter inch. Another important relationship shown in FIG. 9 is that the pencil insert slot S is oriented so that its center coincides with the center of the ellipse, and its longer dimension is parallel to the major axis A—A of the elliptical internal gear 32 on flat plate 34.

The top end 29 of the cylindrical milling cutter 28 is free to move a limited distance toward or away from the axis of rotation of the cutter support assembly 12, and this movement is accommodated by the self aligning bearing 15. As the cutter support assembly revolves about its axis, the pinion gear 30 travels around the elliptical internal gear 32, rotating the cylindrical milling cutter 28. The cutting edge of the cylindrical milling cutter 28 at plane X—X in FIG. 4 follows the path shown in phantom-line circles in FIG. 9, which results in the pencil lead being cut with a flat taper on its sides, with the sides tapering down to a thin linear edge at the end of the pencil. The orbiting cylindrical milling cutter 28 is thus held against the side of the pencil within a theoretical elliptic conic area upstanding from apex 31 (FIG. 5) adjacent the elliptical internal gear 32 to the self aligning bearing 15 on annular bracket 24. FIGS. 2 and 3 show the rotating cylindrical milling cutter with respect to the broad and narrow sides, respectively, of an engaged pencil being cut.

The teeth of the elliptical internal gear 32 form an endless path or track which automatically guides the cutter in an approximately rectangular sharpening pattern upon the rectangular pencil body and rectangular lead bar; that is, the cylindrical milling cutter 28 follows the contour, first, of the wooden pencil, and then of the lead, in each case leaving an approximate flat taper on each side of the pencil. This production of a generally linear edge is accommodated by the fairly loose elliptical internal gear teeth 32 in association with the self aligning bearing 15 and the motor operating speed produced by normal 120 volt alternating current.

Although the foregoing has been a description and illustration of specific embodiments of the invention, various modifications and changes thereto can be made by persons skilled in the art without departing form the scope and spirit of the invention as defined by the following claims.

What is claimed is:

1. A pencil sharpening device for rectangular pencils comprising a frame, an endless track formed by an elliptical internal gear attached to said frame, a cutter means engaged in said elliptical internal gear on one end, a cutter support means coupled to said frame and rotatable on an axis that aligns with the center of said elliptical internal gear and coupled to the other end of said cutter means so that as said cutter support means is rotated said cutter means orbits through an elliptic conic area extending upward from an apex adjacent said elliptical internal gear, and a rectangular pencil slot connected to said frame and aligned with its long dimension in the same direction as the long axis of said elliptical internal gear and with its center aligned with said center of said elliptical internal gear for holding a pencil in position for sharpening by said cutter means.

2. The device of claim 1 which is electrically driven.

3. A pencil sharpening device for pencils of rectangular cross section and having lead of rectangular cross section comprising in combination:

a frame having a rectangular pencil insert slot; and an elliptical internal gear mounted on said frame, said elliptical internal gear having major and minor axes that differ in length by approximately the difference between the long and narrow dimensions of said rectangular lead, and said elliptical internal gear having its major axis coinciding with and parallel to the long dimension of said rectangular pencil insert slot; and a cutter support assembly rotatably mounted on said frame for rotation about an axis coincident with the center of said elliptical internal gear; and a cylindrical milling cutter rotatably supported at one end on said cutter support assembly, the other end of said cylindrical milling cutter being free to move toward and away from the axis of rotation of said cutter support assembly; and a pinion gear on said other end of said cylindrical milling cutter, the teeth of which mesh with the teeth of said elliptical internal gear, whereby said cylindrical milling cutter is revolved about its axis as said pinion gear travels around said elliptical internal gear; and whereby the cutting edge of said cylindrical milling cutter traces a substantially linear path parallel to the long dimension of the pencil lead, with the sides of the lead being tapered down to a thin, linear edge at the end of the pencil.

4. A pencil sharpening devise according to claim 3 wherein said one end of said cylindrical milling cutter is rotatably supported by a self-aligning bearing to accommodate swinging movement of said cylindrical milling cutter as said other end moves toward and away from the axis of rotation of said cutter support assembly.

5. The device of claim 4 which is electrically driven.

* * * * *